United States Patent Office 3,188,550
Patented June 8, 1965

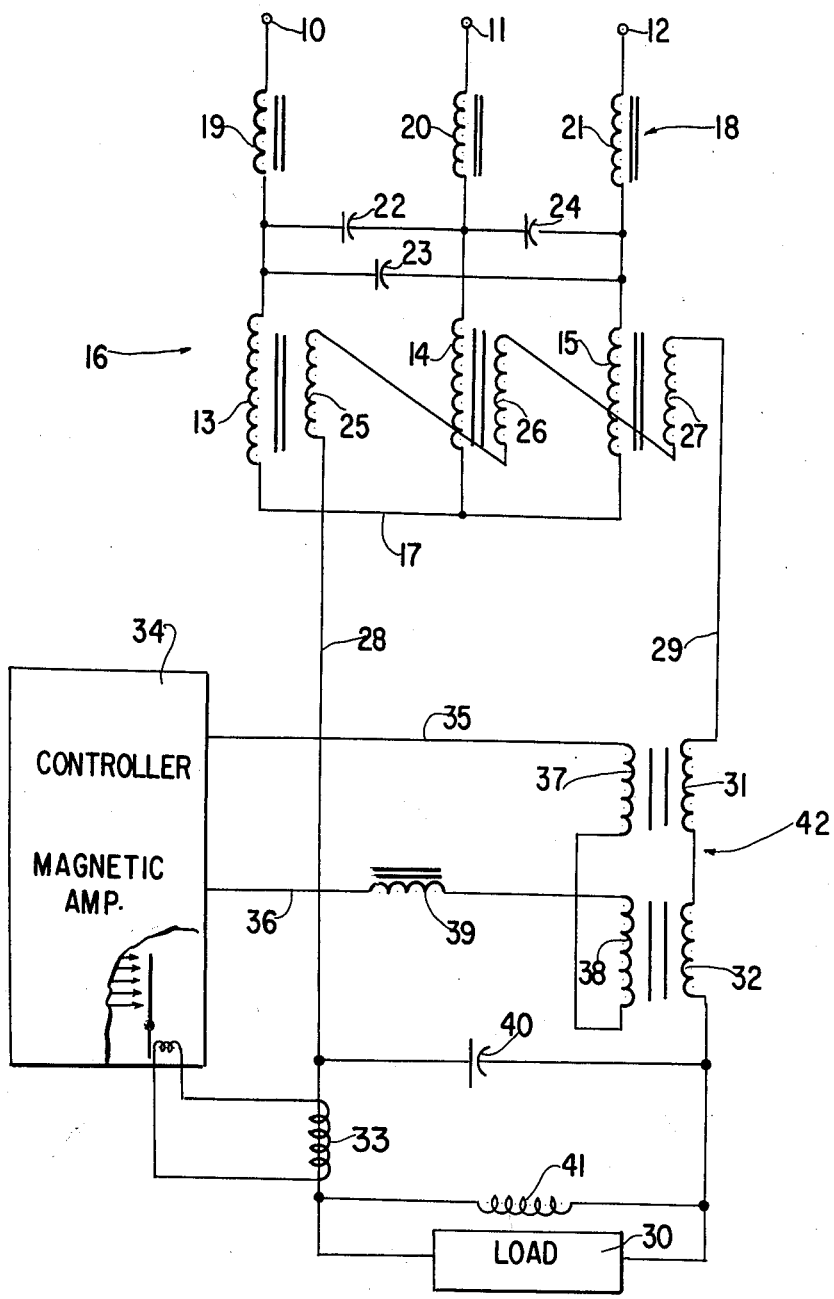

3,188,550
REGULATOR FOR A FREQUENCY MULTIPLIER
Aloysius J. Hauck, Milwaukee, Wis., assignor to Basic Products Corporation, Milwaukee, Wis., a corporation of Wisconsin
Filed June 16, 1961, Ser. No. 117,737
3 Claims. (Cl. 321—68)

This invention relates to frequency multipliers and particularly to control or regulator means therefor.

In some fields, such as airport lighting, it is necessary to be able to feed the runway lights with various levels of current to provide varying degrees of brightness. Also, it has been found desirable in some instances to place the lights and their transformers adjacent to or in the runways and such requires that the elements, especially the transformers, must be small in size. The lamps may be of the incandescent type fed through isolating transformers or may be of the series connected gaseous discharge type or a combination thereof.

One of the objects of the invention is to provide a means whereby the lighting system elements adjacent the runway may be made relatively small.

Another of the objects of the invention is to provide a stable system supplying a higher frequency than the standard line frequency for feeding loads such as airport lighting systems.

Another of the objects of the invention is to provide a simple controlled frequency multiplier system.

In one aspect of the invention, the frequency conversion section may comprise a 3-phase primary connected in a star configuration. Preferably there are linear reactors and shunt capacitors on the input side of said primary. The secondary may comprise three windings connected in series with each other and with the load. A control saturable reactor means, preferably having two load windings, is connected in series between the secondary and the load. As an example, if the input is 3-phase 60 cycle, the parts are chosen and arranged so that the output will be single phase, 180 cycle. A current sensing means, such as a current transformer, is located in the load circuit, said means providing a signal to a controller for controlling D.C. to the control windings of the saturable reactor means. The controller may take various forms, for example, similar to the one shown in Patent No. 2,825,865 to applicant. Such a controller may comprise a comparing and amplifying arrangement including an R.M.S. device and a magnetic amplifier. The controller in response to the current signal will vary the D.C. applied to the control windings of the control saturable reactor means and thus control the current fed to the load. Additionally, the controller may be adjusted to provide various current levels to the load.

These and other objects, advantages and features of the invention will become apparent from the following description and drawings, which are merely exemplary.

In the drawing; the sole figure is a schematic wiring diagram of one circuit which may be used.

In the form shown, a 3-phase supply is used but other multiples thereof can be employed. The 3-phase 60 cycle input is connected at terminals 10, 11, 12 to primary windings 13, 14, 15 of the frequency multiplier indicated generally at 16. Primary windings 13, 14, 15 thereof are connected by lead 17 in a star configuration. A voltage regulating and filter section, shown generally at 18, may be located in the input circuit, such comprising linear reactors 19, 20 and 21, together with shunt capacitors 22, 23, 24. The secondaries 25, 26 and 27 of the frequency multiplier are connected in series with each other and with the load 30 by leads 28, 29. In the form shown, a two-element 180 cycle saturable reactor having load or gate windings 31, 32 is connected in series with the secondaries and the load. A current sensing transformer 33 in the load circuit furnishes a signal to controller 34.

Controller 34 may be any suitable comparing and amplifying means furnishing D.C. through leads 35, 36 to control windings 37, 38 of the control saturable reactor 42. A control circuit choke 39 may be connected in the D.C. supply to the control winding of the saturable reactor. As mentioned, the controller 34 may be similar to that shown in Patent No. 2,825,865. Such may include a magnetic amplifier arrangement having an R.M.S. comparing means therein, as for example an integrating network feeding a device sold under the trademark "Regohm." An example is found in Patent No. 2,650,-957.

The circuit also may include capacitor 40 connected across the load together with a shunt ractor 41, the latter limiting the circuit voltage. Other types of suitable controllers, of course, can be used.

Upon change in load current, controller 34 will compare the load current signal with a reference, amplify the same, and provide a suitable D.C. control to the control saturable reactor. The controller may also include means as described in Patent No. 2,825,865, to change the level of the load current as desired.

It should be apparent that variations in the circuit and components can be made without departing from the spirit of the invention except as defined in the appended claims.

What is claimed is:

1. In a frequency multiplier for changing a 3-phase A.C. source to a higher multiple frequency thereof, the combination including a 3-phase star connected primary, a three winding series connected secondary, means for connecting said primary to a source of A.C., means connecting said secondary to a load, saturable reactor means series connected in one of said secondary connections to the load, said saturable reactor means having D.C. control windings, current sensing means in the load circuit, comparing and amplifying means connected to said sensing means, and means controlled by said comparing and amplifying means for supplying D.C. to said control windings in accordance with the load current so as to control the power delivered to said load.

2. In a frequency multiplier for changing a 3-phase A.C. source to a higher multiple frequency thereof, the combination including a 3-phase star connected primary, a three winding series connected secondary, means for connecting said primary to a source of A.C., means connecting said secondary to a load, a pair of saturable reactors series connected in one of said secondary connections to the load, said saturable reactors having D.C. control windings, current sensing means in the load circuit, comparing and amplifying means connected to said sensing means, and means controlled by said comparing and amplifying means for supplying D.C. to said control windings in accordance with the load current so as to control the power delivered to said load.

3. In a frequency multiplier for changing an $n$-phase A.C. source to a higher multiple frequency thereof, the combination including an $n$-phase star connected primary winding means, an $n$ winding series connected secondary winding means, means for connecting said primary means to a source of A.C., means for series connecting said secondary means to a load, saturable reactor means series connected with the secondary and the load, said saturable reactor means having a pair of gate winding means and control windings therefor, current sensing means in the load circuit, R.M.S. comparing and amplifying means connected to said sensing means, and means controlled by said comparing and amplifying means for feeding D.C. to said control windings in accordance with the load current.

References Cited by the Examiner
UNITED STATES PATENTS

| | | | |
|---|---|---|---|
| 2,517,396 | 8/50 | Logan | 321—68 |
| 2,825,865 | 3/58 | Hauck et al. | 323—7 |
| 2,832,032 | 4/58 | Walker et al. | 323—66 |
| 3,080,517 | 3/63 | Borkovitz | 323—66 |
| 3,099,784 | 7/63 | Forsha et al. | 321—68 |

LLOYD McCOLLUM, *Primary Examiner.*

MILTON O. HIRSHFIELD, RALPH D. BLAKESLEE,
*Examiners.*